Patented Dec. 27, 1927.

1,654,283

UNITED STATES PATENT OFFICE.

WALTER H. DICKERSON, OF EAST ORANGE, NEW JERSEY, ASSIGNOR TO INDUSTRIAL WASTE PRODUCTS CORPORATION, OF DOVER, DELAWARE, A CORPORATION OF DELAWARE.

METHOD OF PREPARING PYROPHOSPHATES.

No Drawing. Application filed November 15, 1923. Serial No. 675,012.

The invention relates to a method of treating materials to produce therein a desired physical or chemical change, or both, purely by the action of heat on said material, and has to do particularly with the production of pyrophosphate from sodium hydrogen phosphate. Operations of this character have ordinarily been carried on heretofore essentially as a furnacing operation, that is to say the material under treatment is subjected in mass to the action of heat and in a suitable furnace.

As a rule, certain definite critical temperature limits are necessary in the treatment of the material; and it is highly desirable, and in many cases necessary, that the temperature be maintained uniformly within the critical limits upon the said material thruout the heat treating process. This latter requirement, however, is difficult to meet when thus treating the material in mass, as different parts thereof will receive different degrees of heat.

Furthermore, some treatments of this character involve chemical action between the material and hot gases. The process forming the subject of the present invention does not, however, contemplate such action, but relates solely to a thermal effect. It has for its object a mode of heat treatment for materials, particularly sodium phosphate compounds, whereby the heat action may more effectively and more efficiently be applied to the material and which treatment will admit, also, of a close thermal control. To this end, the novel method of treatment consists essentially in first preparing the material in a dry and finely divided or comminuted state and then subjecting the same to heat of sufficient intensity to effect therein the desired physical or chemical change, or both, as by suspending, for example thru a spraying operation, the material in a gaseous medium in respect to which it is substantially inert. If the material processed is initially in liquid form this operation involves also a desiccating action, it being understood that the final effect on said material is due purely to thermal action and that the gaseous medium is substantially inert with respect to the material, serving merely as a convenient vehicle therefor in its finely subdivided state.

In the production of sodium phosphate compounds, known as pyro-phosphates, the present practice is to subject the sodium phosphate compounds to heat treatment, in trays, in a furnace where the temperatures on the material are maintained at approximately 425°–450° F. the material being removed after a predetermined time and ground to the desired degree of fineness. In accordance with the novel process forming the subject matter of the present application, the sodium phosphate compounds in finely divided state are for an appreciable period to be subjected to a heating zone at a temperature of from 426°–450° F., as while in suspension in a gaseous medium inert with respect to the material. The dry powdered material is then cooled and collected and is ready for use without any further processing. The process may also be carried out in a single step by spray-drying sodium phosphate solution, in manner well understood, and maintaining for an appreciable period the terminal temperature on the dry product to bring about the desired heat reaction necessary to produce the pyro-phosphate.

I claim:—

1. The method of preparing pyro-phosphates, which consists in preparing a sodium phosphate compound in a dry powdered condition, and subjecting the same while in suspension in a gaseous medium substantially inert with respect thereto to heat of intensity sufficient to convert the sodium phosphate compound to a pyro-phosphate.

2. The method of preparing pyro-phosphates, which consists in preparing a sodium phosphate compound in a dry powdered condition, subjecting the same in finely divided state to the action of a gaseous medium substantially inert with respect thereto and heated to an intensity sufficient to convert the sodium phosphate compound to a pyrophosphate, and collecting the pyro-phosphate product.

3. The method of preparing pyro-phosphates, which consists in preparing a sodium phosphate compound in a dry powdered condition, and subjecting the same while in suspension in a gaseous medium substantially inert with respect thereto to a temperature of 425°–450° F. for an appreciable period.

4. The method of preparing pyro-phosphates, which consists in spraying a solution of a sodium phosphate compound into a desiccating gaseous medium substantially inert with respect thereto to provide the phosphate in a substantially dry powdered condition, and then subjecting it while suspended in the said desiccating medium to heat of an intensity sufficient to convert the powdered phosphate to pyro-phosphate.

5. The method of preparing pyro-phosphates, which includes the step of heating particles of a sodium hydrogen phosphate while in suspension and in motion.

Signed at New York in the county of New York and State of New York this 14th day of November, A. D. 1923.

WALTER H. DICKERSON.